(12) United States Patent
de Groot et al.

(10) Patent No.: US 7,212,253 B1
(45) Date of Patent: May 1, 2007

(54) HOME ENTERTAINMENT SYSTEM AUDIO HANDLING

(75) Inventors: Tom T. J. de Groot, Atlanta, GA (US); Wilhelmus J. Rosendaal, Eindhoven (NL); Robert A. Barnes, Caterham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/574,449

(22) Filed: May 19, 2000

(30) Foreign Application Priority Data

May 22, 1999 (GB) ................................. 9911879.6

(51) Int. Cl.
*H04N 5/268* (2006.01)

(52) U.S. Cl. ...................... 348/738; 348/736; 348/705; 348/553

(58) Field of Classification Search ................ 348/738, 348/731, 736, 553, 725, 730
See application file for complete search history.

(56) References Cited

U.S. PATENT DOCUMENTS

| | | | | |
|---|---|---|---|---|
| 4,581,645 A | * | 4/1986 | Beyers, Jr. .................. | 348/738 |
| 5,389,976 A | * | 2/1995 | Miyagawa et al. ......... | 348/738 |
| 5,446,505 A | * | 8/1995 | Chang Soo et al. ........ | 348/738 |
| 5,539,477 A | * | 7/1996 | Miyajima ................... | 348/738 |
| 5,638,112 A | * | 6/1997 | Bestler et al. .............. | 348/738 |
| 5,646,699 A | * | 7/1997 | Oh et al. .................... | 348/553 |
| 5,787,259 A | * | 7/1998 | Haroun et al. .............. | 709/253 |
| 6,034,737 A | * | 3/2000 | Koyama et al. ............. | 348/552 |
| 6,167,139 A | * | 12/2000 | Kim ............................ | 381/102 |
| 6,263,502 B1 | * | 7/2001 | Morrison et al. ............. | 725/47 |
| 6,411,335 B1 | * | 6/2002 | Jang ............................ | 348/553 |

FOREIGN PATENT DOCUMENTS

JP 10079896 A 3/1998

OTHER PUBLICATIONS

CENELEC Document EN-50157-1: 1997 Domestic and Similar Electronic Equipment Interconnection Requirements: AV Link—Part 1: General.
CENELEC Document EN-50157-2-1: 1998 Domestic and Similar Electronic Equipment Interconnection Requirements: AV Link—Part 2-1: Signal Quality Matching and Automatic Selection of Source Devices.

* cited by examiner

Primary Examiner—Trang Tran

(57) ABSTRACT

A television (10) for use in a home cinema or surround sound system is provided with an additional audio input (58) for a center audio channel signal from a multi-channel surround sound receiver/amplifier (38). Through system control logic, a control and switching stage (28) within the television couples (72) the televisions internal audio channel signal processing and amplifier stages ($G_{TV}, A_{TV}$) in parallel to the input (58) when in the surround sound mode, at the same time disabling the audio signal path from the televisions tuner (60) to the audio signal processors ($G_{TV}, A_{TV}$) and setting (74) the volume level on all channels to a predetermined level to allow volume control (63) from the remote source (38). A home cinema system featuring such a television configuration is also described.

9 Claims, 2 Drawing Sheets

HOME ENTERTAINMENT SYSTEM AUDIO HANDLING

BACKGROUND OF THE INVENTION

The invention relates to home entertainment systems, and to devices for use in such systems. In particular, the present invention relates to so-called home cinema systems comprising at least a television receiver or display screen device coupled with a multiple speaker audio system, as well as to a television receiver for use in such a system.

Home cinema (or home theater) systems allow the user to experience the sound quality of a good cinema set-up in their own home, with a properly set up system creating a 360 degree sound field placing the user in the centre of the action. Home cinema is not just a applicable to films as many television programmes are now broadcast in so-called "surround sound".

The speaker arrangement for a surround sound system typically comprises a pair of main (left and right) speakers, a centre channel speaker, and a pair of surround speakers; optionally, one or more powered subwoofers may be added for additional bass handling. The main speakers are positioned either side of the screen to allow the audio to move left and right with the image on the screen. The centre channel is particularly for a voice track to a video presentation, such that the characters voices are centred on the screen where they appear. Surround speakers carry ambient audio components of the soundtrack, such as reflections, reverberations and echoes, to enable the user to audibly differentiate the different settings for the displayed scene (e.g. in a small room, or a large hall, or outdoors).

There are currently two principal types of home cinema system, the most popular of which is Dolby Pro-Logic, whilst the newer system is Dolby Digital (also known as AC-3): note that "Dolby", "Pro-Logic" and "AC-3" are trade marks of Dolby Laboratories, Inc. There are some important differences between these two systems. Dolby Pro-Logic takes an encoded stereo signal and extracts the centre and surround channel signals, whilst Dolby Digital has five discrete digital channels allowing for much greater channel separation with less noise. Also, in Dolby Pro-Logic the surround channel is monophonic and limited in frequency response (100 Hz–7 kHz) whilst for Dolby Digital it is stereo and has a fuller range, providing a significant improvement. Furthermore, Dolby Digital is backwards compatible with any signal source that it is only encoded in Dolby Pro-Logic.

As will be appreciated, the installation of a high-quality surround sound system can be expensive. A further problem is the amount and complexity of cabling involved in connecting up all the speakers, although the problems of high initial outlay and cabling could be reduced for a user if some components could initially or totally be omitted. To these ends, it has been proposed to use the speaker or speakers built in to a television receiver (for stand-alone operation) to carry the centre channel: however, this can lead to control problems for the user, being required to adjust the main and surround channel settings at source, and the centre channel through the television unit controls.

SUMMARY OF THE INVENTION

It is accordingly an object of the present invention to provide support for a centre audio channel in a home cinema system without requiring a dedicated centre speaker and with simplified control of channel volume settings.

In accordance with a first aspect of the present invention there is provided a television receiver for use in a home cinema system, the receiver comprising: a tuner configured to receive and separate broadcast video and audio signals; a display screen coupled with a display driver arranged to receive and display video signals from the tuner; and one or more speakers coupled with audio signal processing means arranged to receive, process and output audio signals from the tuner; characterised by an input for a further audio signal, together with control and switching means operable to connect said input to the audio signal processing means, disconnect the coupling of tuner and audio signal processing means, and fix operating parameters of said audio signal processing means whilst coupled to said input.

By providing not only for connection of the centre channel on a dedicated input as well as switching between this input and the television tuner, the user can switch in and out of surround sound operation without having to physically reconfigure the system. Furthermore, by fixing the audio signal processing within the television to preset parameters, adjustment of the centre channel at the television is avoided. Where the audio signal processing means includes volume control, the control and switching means suitably fixes operating parameters by setting the volume to a predetermined fixed level.

Where the television tuner is arranged to output audio signals on two or more channels, and the receiver has a speaker coupled with respective audio signal processing means for each such channel (e.g. a stereo television), the control and switching means is preferably operable to connect the audio signal processing means for each channel to said input. In other words, when the television is switched from stand-alone operation to surround sound, the televisions audio system is effectively converted to a mono speaker.

As the audio input for the centre channel need not always accompany a video presentation on the television, the control and switching means may be coupled to the display driver and be further operable to selectively disable video signal display on the screen. Where the television further comprises user operable input means (such as an infra-red linked remote controller), the display driver may suitably be configured to generate for display a menu of user selectable items including connection of the audio signal processing means to either the tuner or input.

Also in accordance with the present invention there is provided a home cinema system comprising a television receiver as described above coupled with an audio receiver and, via the audio receiver, to a plurality of speakers, wherein the audio receiver has an output for a centre audio channel connected to said input of the television receiver. Note that the audio receiver need not, in itself, be a source of audio signals; it may instead comprise audio signal processing means connected to receive and process audio signals from the television receiver tuner and output at least some of the processed signals on the centre audio channel. Alternatively, or additionally, the system may comprise one or more additional audio signal sources and/or processing stages connected to the audio receiver, such that the audio receiver may be considered as a single unit or an integrated audio system. Also, the home cinema system may further comprise one or more video plus audio signal sources coupled with the television receiver, with the television being configured to pass audio signals from such sources to the audio receiver for processing.

BRIEF DESCRIPTION OF THE DRAWINGS

Embodiments of the invention will now be described, by way of example, with reference to the accompanying drawings, in which.

DETAILED DESCRIPTION OF THE INVENTION

Figure 1:
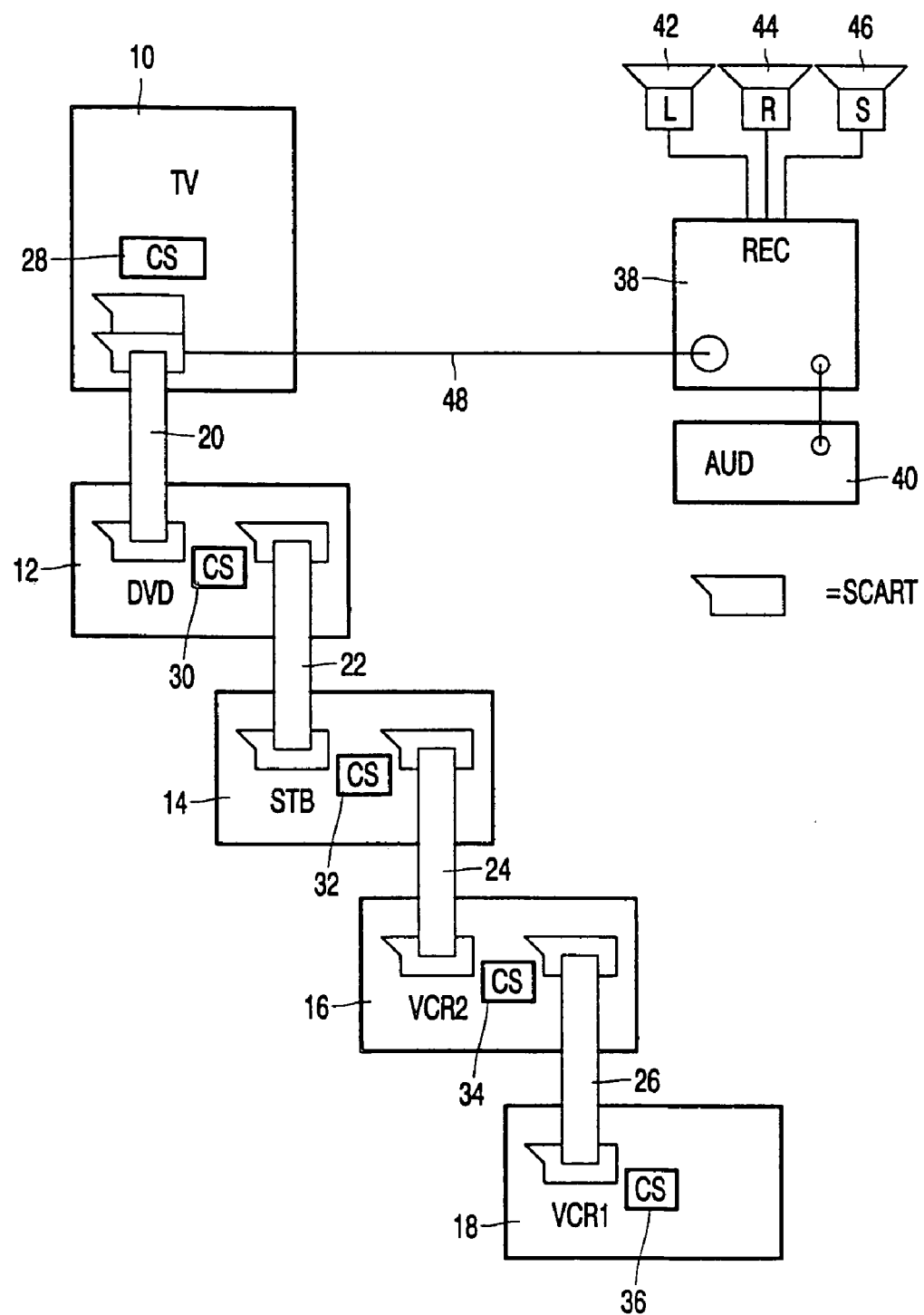
FIG. 1 schematically represents a home entertainment system comprising a plurality of interconnected video and audio devices.

FIG. 1 shows a domestic audio and video (AV) entertainment system comprising a television receiver 10, Digital Versatile Disc (DVD) player 12, set-top box (STB) 14, and a pair of video cassette recorders/players (VCR2, VCR1) 16, 18. These video components are chain-linked by respective SCART links 20, 22, 24, 26 which provide audio and video signal paths (both upstream and down) as well as carrying control information and signals on pin 10. Suitable interconnect protocols to govern such a SCART-linked arrangement of AV devices are described in CENELEC documents EN-50157-1:1997 Domestic and similar electronic equipment interconnection requirements: AV.link—Part 1: General, and EN-50157-2-1:1998 Domestic and similar electronic equipment interconnection requirements: AV.link—Part 2-1: Signal quality matching and automatic selection of source devices.

Within each of the devices 10, 12, 14, 16 and 18 there are shown respective blocks 28, 30, 32, 34, and 36 representing control and switching subdevices. The division of a device into subdevices is necessary only in a logical sense, that is to say, from the point of view of its behaviour relative to the other system components. In the physical implementation of the device, there may or may not be corresponding separate physical subdevices.

Also connected to the television receiver 10 is an audio signal amplifier and/or processing device REC 38 which will be referred to generally herein as the audio receiver. This may be a single device or, as shown, it may be part of an audio system with other interconnected devices 40. For surround sound, the audio receiver 38 provides four, five or six audio output channels: two for the main (left and right) speakers 42, 44; one or two (depending on whether it is stereo or mono) for the surround speakers 46; one for the centre channel, and optionally one for a subwoofer, as mentioned previously. As will be described in detail below, the link 48 between the television 10 and audio 38 receivers not only carries audio signal components received and separated by the television receivers tuner for signal processing and/or other treatments within receiver 38, it also carries the centre channel output back to the television receiver for output from the televisions built-in speakers.

Figure 2:
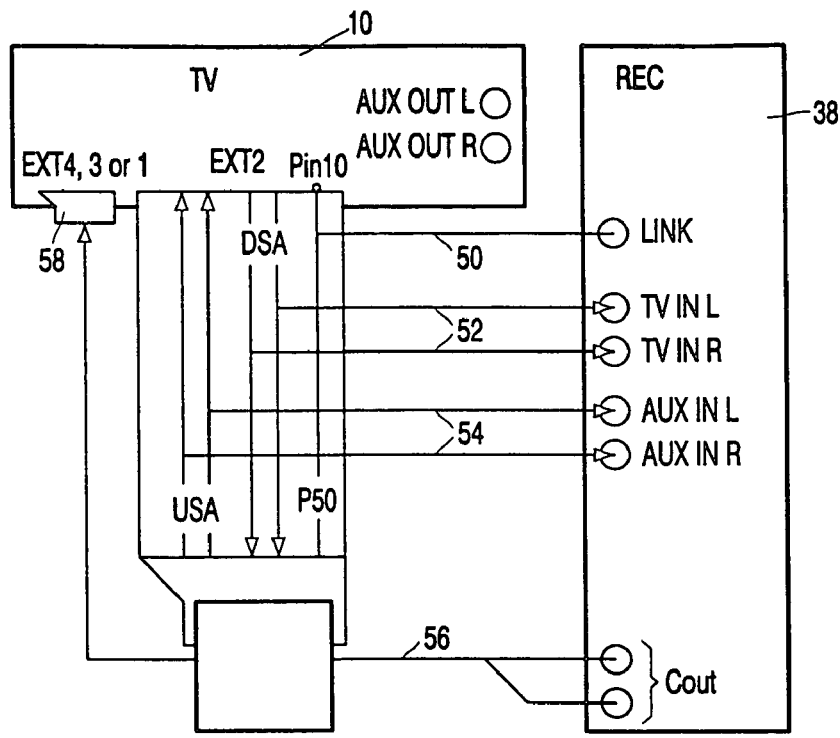
FIG. 2 shows in detail the audio signal connections between the television and audio receiver of FIG. 1.

The audio connections making up link 48 between various input and output connectors of the television 10 and audio receiver 38 are shown in greater detail in FIG. 2. From the line on pin 10 of the televisions output SCART socket, a connection 50 is established to a receiver input (LINK) for the system control data and signals. The left and right downstream audio channels DSA on the SCART link are tapped 52 to give left and right audio inputs to the receiver. The left and right upstream audio channels USA on the SCART link, which may be carrying audio from any of the downstream AV devices (12, 14, 16, or 18; FIG. 1) are tapped 54 to give left and right auxiliary audio inputs to the receiver. Finally, one or two centre channel outputs (COUT) of the audio receiver are connected 56 to an input 58 of the television receiver. As shown, this centre channel input for the television may be via a further SCART connector.

Figure 3:
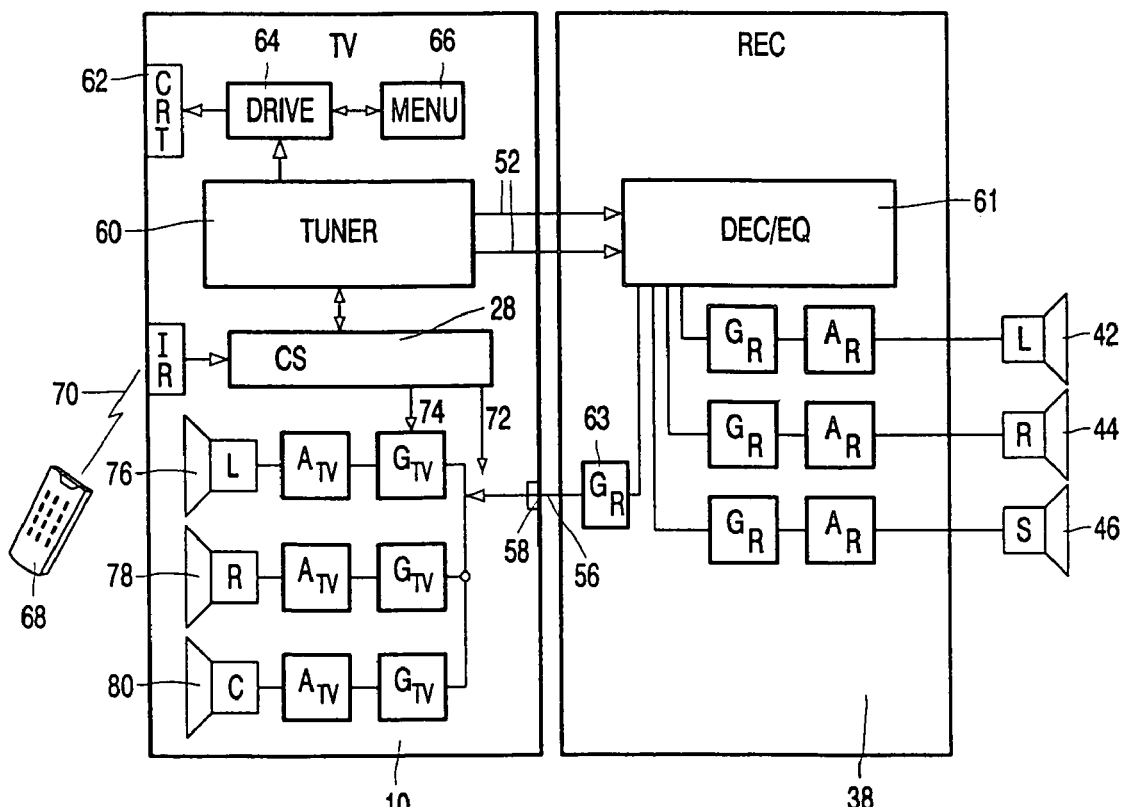
FIG. 3 represents the audio signal path for the system of FIG. 1 in home cinema or surround sound configuration.

The effect of this connection arrangement is to split the systems audio functionality between the television 10 and receiver 38, as shown in FIG. 3: here the illustrated case is for surround sound from a broadcast with the television tuner 60 as the source of the audio signal. The left and right audio signals are delivered via link connections 52 to a surround sound decoder and equaliser stage (DEC/EQ) 61 in the receiver 38, which further separates the surround and centre channel components (a subwoofer channel being omitted for this example). Via respective gain control ($G_R$) and amplification ($A_R$) stages, the receiver outputs the main left, main right, and surround channels to their respective speakers 42, 44, 46 and, via a further gain control 63 and link 56, outputs the centre channel to the television receiver input 58.

FIG. 3 shows further features of the television receiver 10 supporting additional capabilities in relation to the setting up of the television as centre speaker. In addition to the display screen 62 (which may be a cathode ray tube, liquid crystal display, plasma display etc.) and associated display driver circuit 64, there is provided a store 66 for data defining an on-screen display which may be used, as described below, to present various set-up and configuration options to the user, under direction of the control and switching unit CS 28. User input, for making selections from the menu, may suitably be via a remote control handset 68 communicating with the television 10 via infra-red link 70.

As generally indicated by arrow 72, control and switching stage CS 28 also controls a switching circuit (not shown) which may be set to connect the left, right and centre channels for the televisions inbuilt speakers either to the audio signal output from the tuner 60 for stand-alone operation or, as shown, to connect all channels in parallel and to the input 58 for centre channel audio from the receiver 38. As generally indicated by arrow 74, the control and switching stage CS 28 is coupled to gain controls $G_{TV}$ for each internal speaker channel, which in turn are connected to respective amplifier stages $A_{TV}$ and thence to internal left 76, right 78, and centre 80 speakers built into the television unit. In stand-alone operation, the control 74 from CS 28 allows setting of the individual channel volume levels from the user input controls (either on the television unit itself or via remote control handset 68). When the television is acting as centre speaker, CS 28 sets the gain for all channels to a predetermined level (which may be unity) such that overall volume control for the TV as speaker (including muting) is through signal level setting by gain control $G_R$ 63 in the receiver 38 along with the setting for the other speakers 42, 44, 46 in the surround sound set up.

In general operation, if the user wishes to take advantage of the feature of having the television as centre speaker, the link cable 48 (50, 52, 54, 56) must be connected from the receiver 38 to the television 10. Unless additional means are provided, it will not be possible to determine whether the correct configuration of link has been connected; instead, the system may be instructed that the link has been installed through user selection of an appropriate set up option on a menu screen generated from store 66. To avoid problems for the user, this menu option is preferably only made available when the television has detected, via interrogation on LINK line 50 (or an equivalent connection), that the receiver 38 is present and is suitably configured to provide the centre channel signal.

From the foregoing, it will be seen that the television acts as centre speaker only when the receiver is producing (or at least processing) audio on behalf of the television, and the particularly configured link lead 48 has been installed. In this case, the television treats the input at 58 as the source of audio, even though the video is coming from a different source (i.e. tuner 60). In the case that a purely audio source is selected by the user (e.g. AUD 40; FIG. 1), the television will suppress or black mute any video signal from tuner 60 to the display 62. If, for some reason, the user wishes to listen to one source and watch video from another, the control link 50 must first be disabled.

As mentioned, the user specifies that the television should act as centre speaker via menu selection. The receiver 38 may also provide for television menu selection and setting of its facilities (via control link 50) with the receiver offering in the menu the option for the user to specify whether there is a centre speaker as a "yes/no" option, with "no" causing it to generate a phantom centre channel. If the television is turned on, and the user has specified that the television is to act as centre speaker, then the receiver will automatically select "centre speaker=yes" from its own menu and output the centre channel on link 56. The manual choice of the user on the receiver menu (yes/no) is stored so that, if the television is turned off, the receiver will revert to the state previously selected by the user.

An audio-only source, such as AUD 40 (FIG. 1) may be in surround sound and consequently require the television to be switched on to act as centre speaker. If both television 10 and receiver 38 are initially in standby mode and if the receiver is woken up and AUD 40 is selected as source, unless surround sound has been selected as the system default setting (regardless of source) and the system control logic is set accordingly, it will be necessary for the user to specifically wake or turn on the television to act as centre speaker. One button activation to awake the television, however, may also activate the underlying control logic for the surround sound set up which may in turn cause the receiver to select the television as the audio source: in such circumstances, it would then become necessary to reselect AUD 40 as the audio source.

From reading the present disclosure, other modifications will be apparent to persons skilled in the art. Such modifications may involve other features which are already known in the design, manufacture and use of local communication bus systems, domestic audio/video apparatuses and component parts thereof and which may be used instead of or in addition to features already described herein.

The invention claimed is:

1. A television receiver for use in a home cinema system, the receiver comprising:
   a tuner configured to receive and separate broadcast video and audio signals;
   a display screen coupled with a display driver arranged to receive and display video signals from the tuner;
   a plurality of speakers coupled with audio signal processing means arranged to receive, process and output signals of respective audio channels from the tuner; and
   an input for an audio only signal, said input coupled to a control and switching means operable to switch between 1) surround sound operation that, by means of said input, provides a common feed of a center audio channel to the plural speakers; and 2) operation that bypasses surround sound processing to deliver audio over said plural speakers, wherein said control and switching means is coupled to said display driver and is further operable to selectively disable the video signal on said display screen, when an audio only signal is detected.

2. A television receiver for use in a home cinema system, the receiver comprising:
   a tuner configured to receive and separate broadcast video and audio signals;
   a display screen coupled with a display driver arranged to receive and display video signals from the tuner;
   one or more internal speakers residing inside the television receiver, coupled with audio signal processing means and arranged to receive, process and output audio signals from the tuner;
   an input for an audio only signal by which the one or more speakers, if receiving said audio only signal, operate as a center channel for a plurality of speakers located externally to, and linked communicatively with, said receiver; and
   control and switching means operable to switch connection of the audio only signal processing means from the tuner to said audio only input, and to remove volume level from user control while connection is to said input and to disable the video signal on said display screen.

3. The television receiver of claim 2, wherein the audio signal processing means includes volume control, and the control and switching means fixes operating parameters by setting volume control to a predetermined fixed level.

4. The television receiver as claimed in claim 2, wherein the tuner is arranged to output audio signals on two or more channels, the receiver comprising a speaker coupled with a respective audio signal processing means for each such channel.

5. A television receiver as claimed in claim 2 coupled with an audio receiver and, via the audio receiver, to the plurality of speakers, wherein the audio receiver has an output for a center audio channel connected to said input of the television receiver.

6. A method for operating a television receiver for use in a home cinema system, said comprising the steps of:
   using a tuner to receive and separate broadcast video and audio signals;
   arranging a display driver to receive and display video signals from the tuner;
   coupling a display screen with the display driver;
   coupling one or more internal speakers, residing within the television receiver, with audio signal processing means arranged to receive, process and output audio signals from the tuner;
   providing a plurality of speakers external to said receiver and linking said plurality of speakers communicatively to said receiver;
   providing an input for an audio only signal by which the one or more speakers, if receiving said audio signal, operate as a center channel for said plurality of speakers; and
   operating control and switching means to switch connection of the audio only signal processing means from the tuner to said input, and to remove volume level from user control while connection is to said input and to disable the video signal on said display screen.

7. The method of claim 6, wherein the audio signal processing means includes volume control, and the control and switching means fixes operating parameters by setting volume control, to a predetermined fixed level.

8. The method of claim 6, wherein the tuner is arranged to output audio signals on two or more channels, the receiver comprising a speaker coupled with a respective audio signal processing means for each such channel.

9. A television receiver for use in a home cinema system, the receiver comprising:
- a tuner configured to receive and separate broadcast video and audio signals;
- a display screen coupled with a display driver arranged to receive and display video signals from the tuner;
- a plurality of speakers coupled with audio signal processing means arranged to receive, process and output signals of respective audio channels from the tuner; and
- an input for a further audio signal, said input coupled to a control and switching means operable to switch between 1) surround sound operation that, by means of said input, provides a common feed of a center audio channel to the plural speakers; and 2) operation that bypasses surround sound processing to deliver audio over said plural speakers, wherein the bypassing operation affords user control of volume levels of said respective audio channels, whereas said control and switching means sets volume for said center audio channel to a predetermined fixed level under said surround sound operation and disables the video signal on said display screen, when an audio only signal is detected.

* * * * *